May 30, 1967
C. G. JOA
3,322,589
SANITARY NAPKIN OR THE LIKE AND A
METHOD OF MANUFACTURE THEREOF
Filed April 2, 1962
3 Sheets-Sheet 3
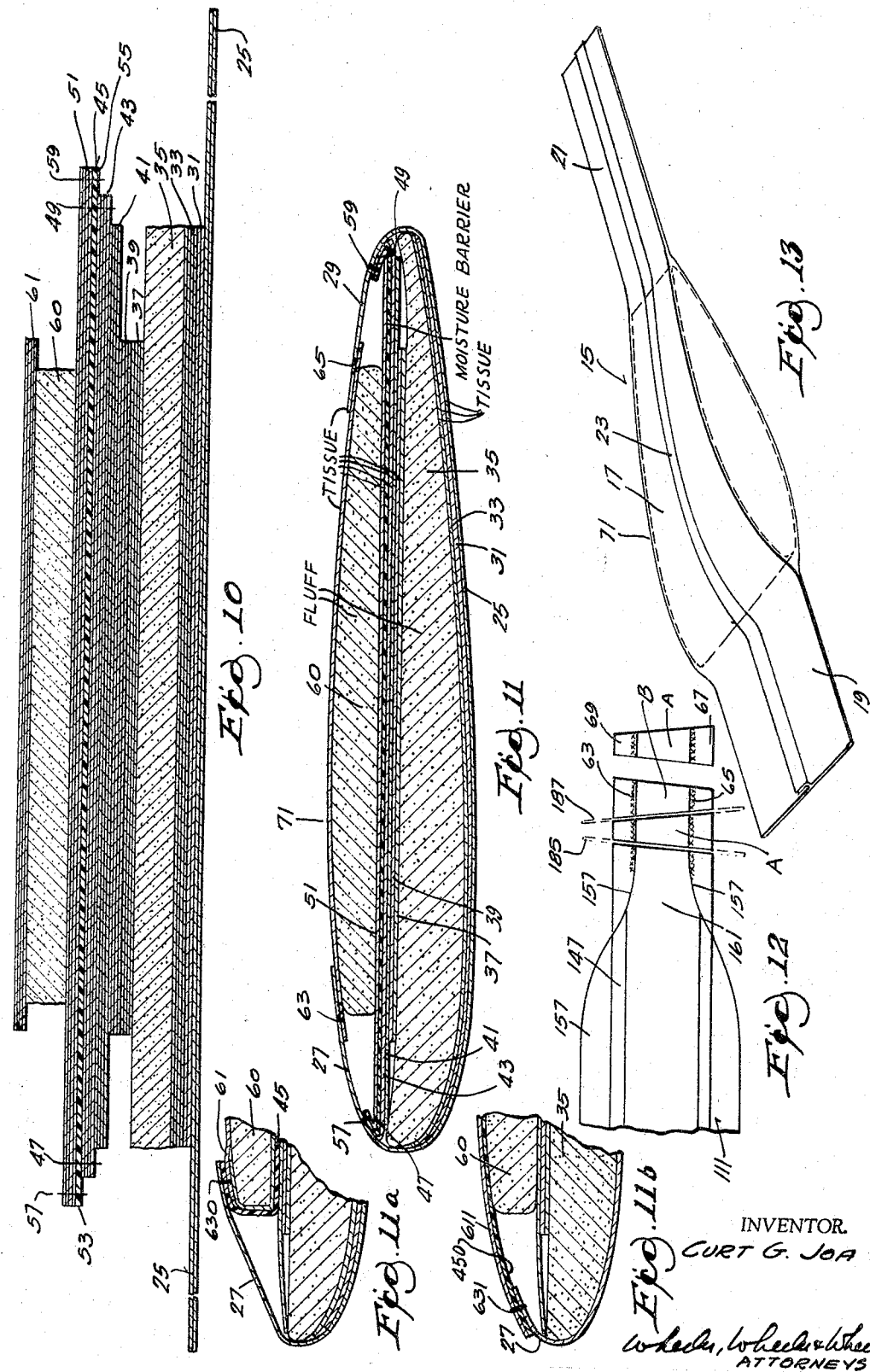
INVENTOR.
CURT G. JOA
Wheeler, Wheeler & Wheeler
ATTORNEYS United States Patent Office 3,322,589
Patented May 30, 1967

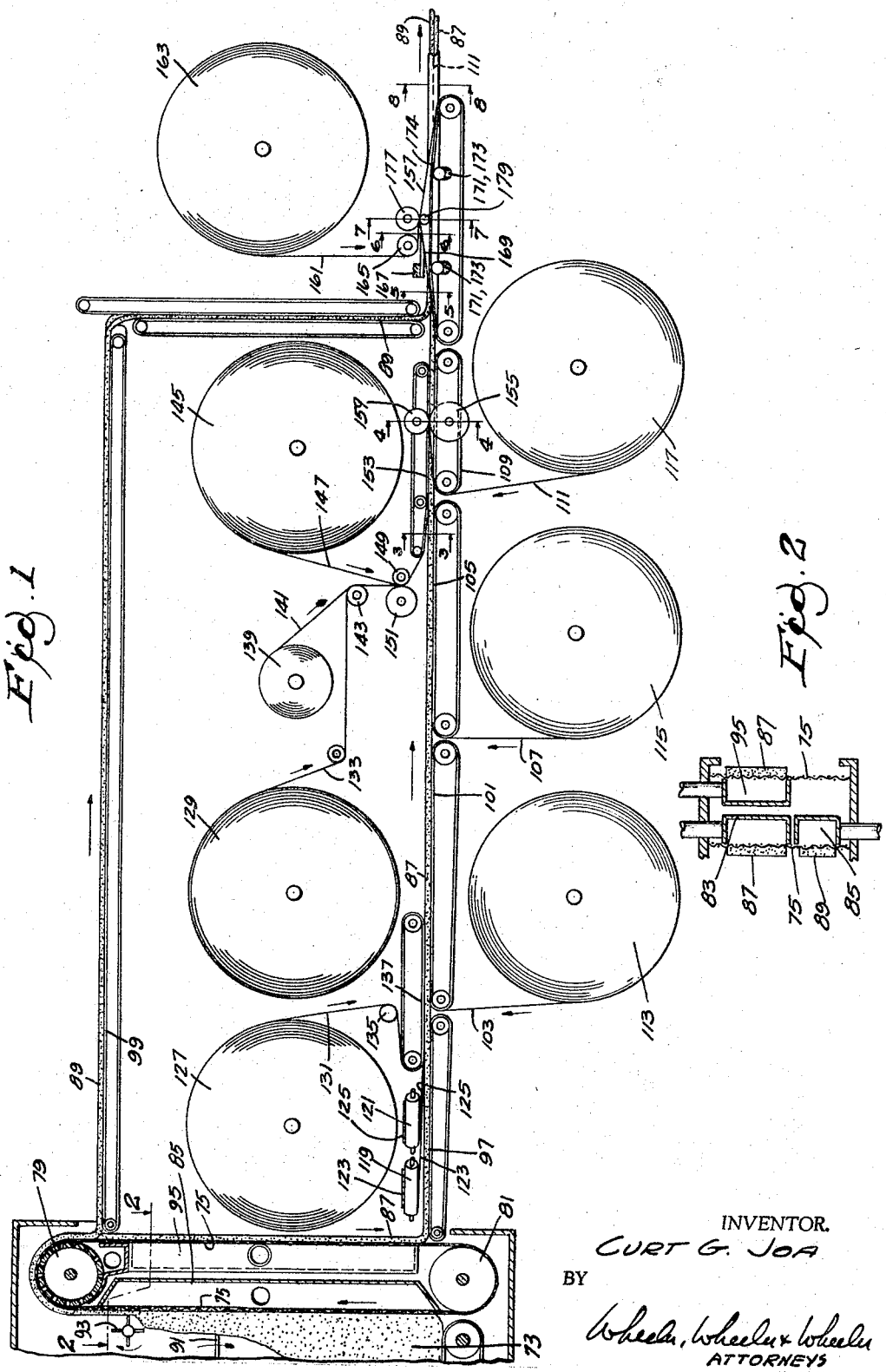

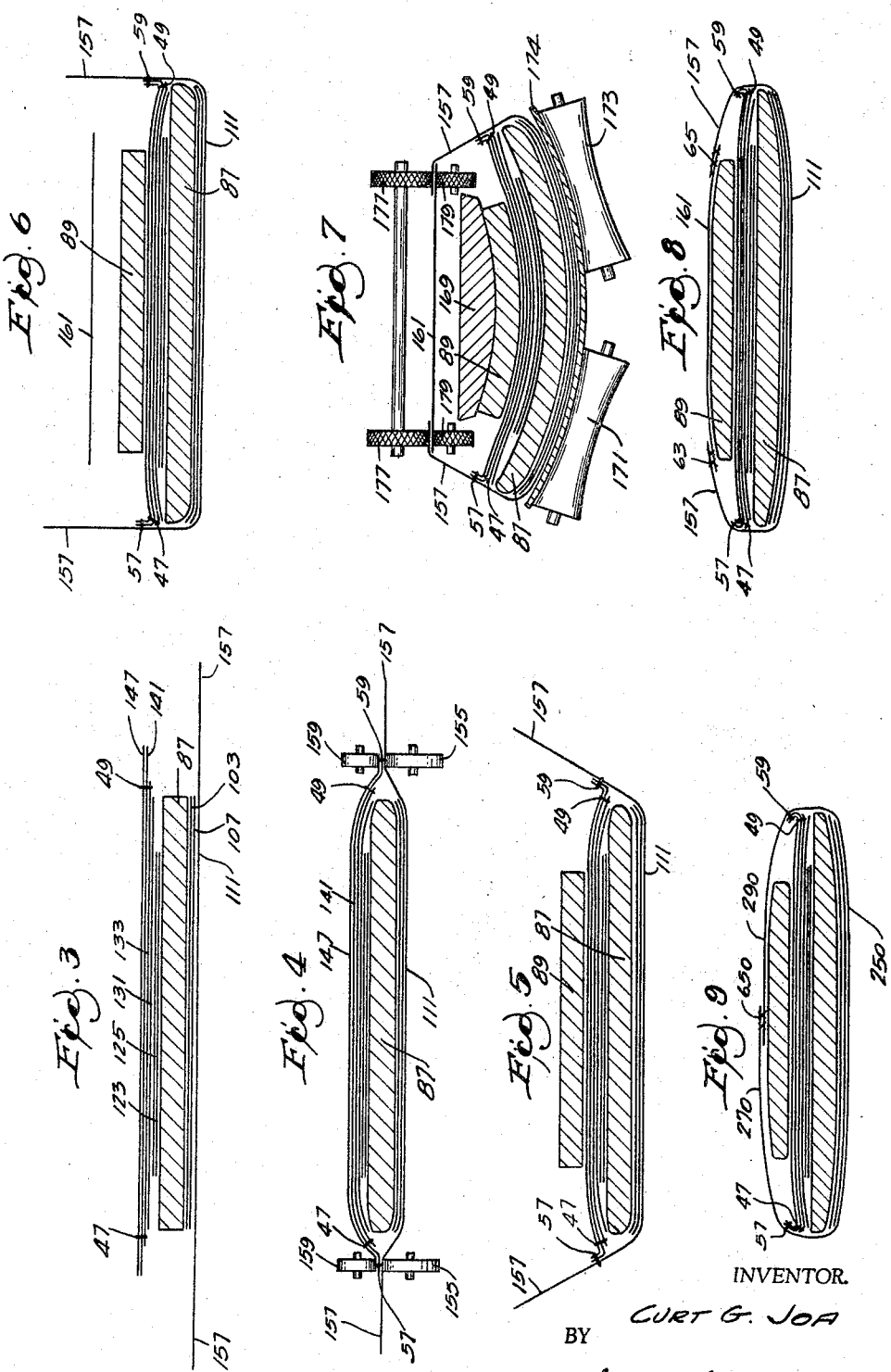

3,322,589
SANITARY NAPKIN OR THE LIKE AND A
METHOD OF MANUFACTURE THEREOF
Curt G. Joa, Ocean Ridge, Fla.
(P.O. Box 1121, Boynton Beach, Fla. 33435)
Filed Apr. 2, 1962, Ser. No. 184,105
8 Claims. (Cl. 156—250)

This invention relates to a sanitary napkin or the like and a method of manufacture thereof.

Both structural and in terms of method, the improvement is principally concerned with the pad, which is generally of the type shown in the patent to Dudley 2,973,760 issued Mar. 7, 1961, and which is characterized by a tapering reduction in width from one end to the other and by the use of various layers of fluff and creped wadding associated with a barrier ply of such material as polyethylene. An important feature of the instant device consists in enclosing the ends of the pad by the extension of some of the creped tissue plies around the ends of the fluff components, the preferred arrangement being one in which the external tissue plies wrap the rest of the pad from end to end under a substantial degree of tension. This wrap not only assists in giving the desired reduction in pad thickness at the ends thereof but also insures against disintegration of the end portions of the fluff plies. These portions are along the side margins of the bat used in the manufacture of the pad and are more subject to loss of fiber than other portions of the fluff filler. Hence the feature of confining both ends of the pad is of substantial advantage.

Another feature is the use of the moisture barrier ply as a means of providing a heat seal to tissue plies. In practice, the heat seal connects upper and lower tissue plies around a fluff bat to maintain the assembly.

From a method standpoint, a significant feature is the formation of an endless bat and the use of the bat in pad assembly in one continuous operation, without the usual intervening step of winding the bat into several rolls of material from which pads are subsequently made. Another significant step is the use of the barrier ply as a means of providing heat sealed connections, preferably along a plurality of lines parallel to the direction of movement of the work during assembly. This step provides for connection between various plies which could not otherwise be heat sealed.

Another feature of the method involves the channelling of the advancing assembly preliminary to the final connection of some of the external plies with the wrapping tissue in order that such connection may be achieved without tension under conditions whereby the requisite degree of tension will develop when the work flattens after being released from the channelling influence.

In the course of manufacture, the two margins of the advancing work are subjected to substantial compression which somewhat flattens the work along both margins. At this stage, the work represents a continuous laminated web. When the individual pads are severed from this web by transverse cuts which converge toward one side of the web, the resulting pads alternately have their wide ends along one margin of the web and their narrow ends along the other, intervening pads being reversed in position. Despite the fact that the compression of the fluff has been uniform as between the respective ends of the resulting pads, it will be found that after the compacting pressure in the construction of the composite bat is relieved, the ensuing expansion of the fluff content thereof will be greater at the wide end of the pad than at the narrow end thereof, thus giving the pad exactly the desired form. The disparity in thickness between the wide and narrow ends of the end product is due to the fact that the greater mass of material at the wider end reacts upwardly rather than laterally in the course of its expansion.

In the drawings:

FIG. 1 is a view in longitudinal section through the equipment fragmentarily and diagrammatically illustrating apparatus used in the manufacture of sanitary napkin pads according to the present invention, the component materials being shown in side elevation.

FIG. 2 is a fragmentary detail view taken in section on line 2—2 of FIG. 1.

FIG. 3 is a diagrammatic, enlarged detail view through the bat in the course of assembly thereof taken on the line 3—3 of FIG. 1.

FIG. 4 is a diagrammatic, enlarged detail view taken in section of the bat on line 4—4 of FIG. 1.

FIG. 5 is a diagrammatic, enlarged detail view taken in section through the bat on the line 5—5 of FIG. 1.

FIG. 6 is a diagrammatic, enlarged detail view taken in section through the bat on the line 6—6 of FIG. 1.

FIG. 7 is a diagrammatic, enlarged detail view taken in section through the bat on line 7—7 of FIG. 1.

FIG. 8 is a diagrammatic, enlarged detail view taken in section through the bat on line 8—8 of FIG. 1.

FIG. 9 is a diagrammatic view similar to FIG. 8 taken through a modified bat construction.

FIG. 10 is a greatly enlarged diagrammatic detail view in transverse section showing the unconnected component plies which make up the bat from which the pads are cut in the preferred method of manufacture herein disclosed.

FIG. 11 is a detail view in cross section longitudinally through a pad embodying the present invention, the pad being shown in the position of manufacture which is inverted from the position of use.

FIG. 11a and FIG. 11b are fragmentary views similar to FIG. 11 showing modified arrangements.

FIG. 12 is a fragmentary plan view on a reduced scale (as compared with FIG. 11) illustrating a portion of the bat and showing the lines upon which the bat is severed to cut the pads therefrom.

FIG. 13 is a view showing in perspective a sanitary napkin made in accordance with this invention, the scale being larger than that of FIG. 12 but smaller than that of FIG. 11.

The completed sanitary napkin 15 shown in FIG. 13 comprises a wrapper 17 having projecting ends at 19 and 21. While gauze may be used in accordance with conventional practice, the particular wrapper shown is made according to my application Ser. No. 95,767, filed Feb. 2, 1961 which discloses a wrapper made of non-woven fabric which comprises heat sealable material and has a seam 23 from end to end made in any desired manner, the projecting end portions 19 and 21 preferably being additionally sealed to completely enclose the pad.

The pad as finished preliminary to wrapping is shown in FIG. 11. It will be understood that as illustrated the pad is inverted from the position in which it will be used. The lamina 25 is made up of two or more plies of tissue. It will be understood that the number of plies and dimensions may be varied and the particulars here given are by way of example and not by way of limitation. In practice, the lamina 25 is thirteen inches in length having end portions 27 and 29 folded over and extending at least partway across the top of the composite pad. Upon the lamina 25, there is a two-ply lamina 31 and, for convenience, a separately fabricated four-ply lamina 33, making a total of eight plies of tissue. The plies constituting the laminae 31 and 33 are, in preferred practice, eight inches in length as viewed in FIG. 10.

Upon these several laminae of tissue is a bat 35 which is eight inches long in preferred practice. Upon this rest two separately fabricated four-ply laminae 37 and 39 which are each six inches in length, in practice. Upon these rests a four-ply lamina 41 which is eight inches long in practice and another four-ply lamina 43 which is eight and one-half inches long in practice.

The sheet 45 not only provides a moisture barrier but also it uses a heat seal connection of certain of the component parts. Such a connection is illustrated at 47 and 49 to attach both ends of the laminae 43 to the barrier sheet 45. The same connections at 47 and 49 also attach the barrier sheet 45 to an overlying lamina 51 which, in practice, comprises four plies of tissue which, like the barrier sheet, are nine inches in length. The connections 47 and 49 are made short of the ends 53, 55 of the barrier sheet and the lamina 51 of tissue, these ends being folded over after being heat sealed at 57 and 59 to the end portions 27, 29 of the first lamina 25 in an operation hereinafter described. Sheet 45 is made of heat sealable material such as polyethylene.

Upon the lamina 51 rests another bat 60 of fluff. This will be the lower bat when the pad is used. In practice, this is only five and one-half inches in length. Covering it is a lamina 61 comprising four six-inch plies of tissue. These are lapped by the ends 27, 29 of tissue ply 25 and knurled pressure rolls interlock the fibers of lapping plies at 63 and 65 to complete the pad.

If desired, the separate lamina 61 may be omitted and the ends 270 and 290 of the lamina 250 may be given sufficient extent to cover the entire bat 60 and connected by a single zone of interlocked fiber as shown at 650 in FIG. 9.

In the modification shown in FIG. 11a, the heat sealable ply 45 is turned up about the margin of bat 60 and heat sealed at 630 to the margins of webs 27 and 61, thus eliminating the fiber interlocking operation.

In the modification shown in FIG. 11b, the heat sealable barrier ply 450 is laminated to tissue ply 611 to provide at 631 a heat sealed connection between plies 27 and 611.

The method of manufacture, as hereinafter described, produces a sanitary napkin which is materially wider at the pad end 67 than at the pad end 69 and has its greatest thickness at a point 71 which is nearer the wide end 67 than the narrow end 69. In the process of manufacture, the two ends are both subjected to pressure which reduces their thickness. However, the fluff material has considerable resilience and to the extent to which expansion is permitted it by the tension wrap and sealing operations, the fluff expands. Its capacity for expansion in the direction of its thickness is greater where the pad is wide than where the pad is narrow, this accounting for the fact that the area of maximum thickness is nearer the wide end of the pad.

The method of manufacture will now be described, reference being made to the diagrammatic showing in FIG. 1 and FIG. 2.

In accordance with the disclosure of my copending application Ser. No. 646,696, now Patent 3,086,253, granted April 23, 1963, shredded wood fiber 73 is delivered pneumatically or otherwise upon the surface of a screen belt 75 operating upwardly over an upper vacuum pulley 79 from a lower pulley 81. Behind the belt 75, there are vacuum boxes 83 and 85 slightly spaced to provide two well-defined endless bats 87 and 89 as shown at FIG. 2. The thickness of these bats is determined by a succession of paddle wheels 91 and 93 which remove undesired surplus fiber deposited on screen 75.

Another vacuum box 95 extends downwardly from pulley 79 on the descending run of the screen belt 75 to hold the endless bat 87 intact until it leaves the screen belt and passes outwardly on the conveyor 97. The endless bat 89, in the meantime, is delivered onto conveyor belt 99 which has a slight inclination laterally of the machine to bring the bat 89 into registry with bat 87 in order that the two bats may be incorporated into the composite assembly in superposed relation.

The conveyor for the bat or fluff web 87 is discontinuous. This fluff web passes from conveyor 97 onto conveyor 101 which already carries web 103 which is a composite four-ply web of tissue from which is later severed the lamina 33 above described. From the conveyor 101, the web 103 and the end of bat 87 pass onto another conveyor 105 which carries a web 107 comprising four plies of tissue from which is later severed the lamina 31 above described. From conveyor 105, the webs 107 and 103 and bat 87 pass onto conveyor 109 which carries a web 111 comprising four plies of tissue materially wider than the plies 103 and 107 and later to provide the lamina 25 above described. The several webs 103, 107 and 111 are drawn from supply rolls 113, 115 and 117, respectively.

The angled guide rollers 119 and 121 feed in lateral and in superposed relation two relatively narrower webs of multi-ply tissue 123 and 125, respectively, each of which comprises a number of plies of tissue each of which is preferably narrower than the webs 103, 107 and 111. The webs 123 and 125, respectively, provide the laminae 37 and 39 above described. The webs 123 and 125 come from feed rolls (not shown) similar to the feed rolls illustrated, but located in different planes, for delivery laterally to the assembly line.

There is room between the endless bats 87 and 89 for supply rolls 127 and 129 from which the multi-ply tissue webs 131, 133 are respectively fed. Web 131 passes around the guide roller 135 and beneath conveyor 137 which presses it onto the previously delivered laminated web 125. Web 131 ultimately provides lamina 41.

The supply roll 139 feeds polyethylene web 141 which passes around guide roller 143 with web 133. From another roll 145, web 147 passes with webs 133 and 141 between the narrow heat seal rolls 149 and 151 which form narrow heat seal lines 47, 49, as shown in FIG. 3. Web 133 is somewhat narrower than the polyethylene web 141 and the multi-ply tissue web 147 to leave the polyethylene web 141 exposed beyond the margins of web 133. Web 133 provides the lamina 43 in FIG. 11. The polyethylene web 141 forms the moisture barrier 45 in FIG. 11 while web 147 forms the lamina 51.

The heat-seal-connected pre-laminate composed of webs 133, 141 and 147 now passes beneath pressure conveyor 153 being thereby assembled with the other laminae above and below the endless fluff bat 87 as shown in FIG. 3.

If a second heat seal is desired (this being optional), the matrix rolls 155 of a second heat sealer engage the margins 157 of the wide web 111 and these are heat sealed to the polyethylene web 141 and to the margins of the tissue lamina 147 by the complementary heat seal rollers 159, as shown in FIG. 4, the narrow zones of the heat seal being shown at 57 and 59. Although these lines of heat seal are just outside of the side margins of the lower fluff bat 87, they will be at the ends of the completed pad shown in FIG. 7.

As shown in FIG. 4, the narrower bat 89 is now superposed as shown in FIG. 5.

As the margins 157 at the sides of the moving webs continue to be raised to the position shown in FIG. 6, the web 161 comprising four plies of tissue (in the present exemplification) is fed down from supply roll 163 about the guide roller 165 to overlie the fluff bat 89. Ultimately, the multi-ply web 161 will provide the cover ply 61 of the completed pad shown in FIG. 11.

As best shown in FIG. 7, a transverse bracket 167 supports a shoe 169 which cooperates with supporting rollers 171, 173 for conveyor 174 to hold in channel form all previous components of the compound web, whereof the fluff bat is the uppermost component. This brings the side margins 157 of the multi-ply bottom lamina 111 sufficiently close together so that they can be joined to the margins of the multi-ply web 161 by interlocking the fibers of the plies by means of the pairs of knurled rollers 177, 179, as shown in FIG. 7.

When the assembly passes beyond shoe 169 and rolls 171, 173, the assembly flattens out and the zones of interlocking fiber connection at 63 and 65 hold the margins 157 in tension to complete the tensioned enclosure by the webs 111 and 161 of the several webs 107, 103, 87, 131, 133, 141, 147 and 89. The cross section of the composite web is now as shown in FIG. 8.

FIG. 12 diagrammatically shows the formation of the composite web and the cutting of the pads therefrom. As the composite web advances, laterally convergent rotary cutting knives or saw disks in the location generally indicated at 185 and 187 in FIG. 12, temporarily advance with the compound web and descend through the web to sever completed pads therefrom, such pads alternating in orientation as shown at A and B, the wide ends 67 of the pads A being along one margin and the wide ends 67 of the pads B being along the opposite margin. The pads may then be wrapped in any desired manner, the procedure being preferably as outlined in my companion application Ser. No. 95,767 above identified.

The advance of cutting knives or saws with the work is well-known to the art as a means of avoiding an intermittent dwell of the work to permit the saws to perform their function of severing the individual pads. However, in this instance, it is of particular advantage to have the saws move with the work while making the cut, since the operation is otherwise continuous from the raw material to the finished pad.

While almost all of the dimensions given are relative and by way of exemplification, it will be observed that one item of major advantage is the projection of the heat seal and moisture barrier 141 beyond the multi-ply lamina 133. While the plastic will penetrate to effect a heat seal through one or more plies of tissue, the first ply should be exposed to the plastic for direct contact therewith. This is done by making the lamina 133 narrower than the heat sealable web 141, thus making it possible to achieve one or more sets or pairs of heat sealed connections with the same web of heat sealable material, the connection made at 57 being outside of the connection made at 47 and the connection made at 59 being outside of the connection made at 49. In each instance, the outer line of heat sealed connection can be very close to the inner line of heat sealed connection.

I claim:

1. A method of making a pad which includes a fluff bat enveloped in plies of tissue, such method consisting in the steps of forming a composite web by laminating together webs of fluff and of heat sealable material and of tissue, and fusing the heat sealable material in pressure engagement with tissue webs to connect such tissue webs about said web of fluff, and thereafter cutting the composite web transversely to provide pads elongated transversely of the composite web and having opposite end margins enclosed in tissue.

2. A method of making a pad which includes a bat, such method consisting in laminating together a web of bat material and relatively wider webs of wrapping material, connecting said wider webs about the side margins of the web of bat material to make a composite web in which the bat material is enclosed in wrapping material, and thereafter cutting the composite web transversely at intervals materially shorter than the width of the composite web to provide pads elongated in a direction transverse respective the composite web and in which the bat material is exposed at the side of the pad and has its ends enclosed, the wrapping material extending completely about each pad longitudinally thereof.

3. A method according to claim 2 in which a web of heat sealable material is laminated between the web of bat material and one of the webs of wrapping material and connecting the webs of wrapping material which comprises a heat sealing operation using the material of the heat sealable web to connect the material of two plies of covering material.

4. A method according to claim 2 which includes the step of continuously forming the web of bat material and continuously advancing the several webs during the lamination thereof to produce said composite web.

5. A method according to claim 2 in which individual pads are severed from the composite web by making two cuts transversely of the composite web on lines converging laterally thereof and subsequently making two like cuts through the composite web on lines offset from the first mentioned cuts to produce like pads having relatively wider and narrower ends an alternating in position as severed from the composite web.

6. A method of making a pad which includes a plurality of fluff bats and plies of tissue above, between, and beneath said bats; which method consists in forming a composite web by laminating upper and intermediate and lower webs of tissue to upper and lower webs of fluff, providing a connection between webs of tissue to enclose at least one of the webs of fluff, and thereafter severing pads from the composite web by cutting such composite web transversely at intervals materially shorter than the width of the composite web, whereby each such resulting pad is elongated and has two fluff side margins exposed and two fluff end margins enclosed by tissue and top and bottom faces enclosed by tissue.

7. A method according to claim 6 in which the severance of the pads from the composite web is effected by making spaced pairs of cuts through the composite web upon lines converging toward one side thereof, the pairs of cuts being spaced by a distance such as to form one such pad between the cuts constituting said pairs of cuts, consecutive pads alternating in position and respectively having wide ends at opposite sides of the composite web.

8. A method of making a pad for a sanitary napkin which method includes pressing together webs of tissue and elastically compressible fluff between the tissue webs to provide a composite web in which the fluff is enveloped by tissue, connecting tissue components of the composite web about the fluff, severing from the composite web pads elongated transversely of the composite web and having relatively wide and narrow ends at each of which the fluff is enveloped in tissue, and releasing the pressure whereby to permit the fluff to expand to produce a pad of fluff tightly wrapped endwise in tissue.

References Cited

UNITED STATES PATENTS

| 2,283,137 | 5/1942 | Fine | 156—202 |
| 2,322,692 | 6/1943 | Hunt | 156—202 X |
| 2,578,664 | 12/1951 | Beery et al. | 156—306 X |
| 2,618,816 | 11/1952 | Joa | 128—290 X |
| 2,897,109 | 7/1959 | Voigtman | 156—306 X |
| 2,952,259 | 9/1960 | Burgeni | 128—290 |
| 2,960,089 | 11/1960 | Harwood et al. | 128—290 |
| 2,973,760 | 3/1961 | Dudley | 128—290 |
| 3,031,356 | 4/1962 | Bousquet et al. | 156—202 |

EARL M. BERGERT, *Primary Examiner.*

R. H. HOFFMAN, *Examiner.*

C. F. ROSENBAUM, J. J. BURNS, H. F. EPSTEIN,
*Assistant Examiners.*